Sept. 10, 1968   A. T. C. BURROWS   3,400,666
CONVEYOR SYSTEMS
Filed Jan. 16, 1967   6 Sheets-Sheet 1
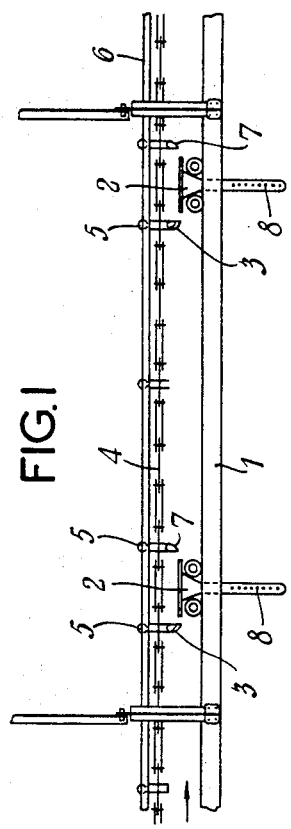
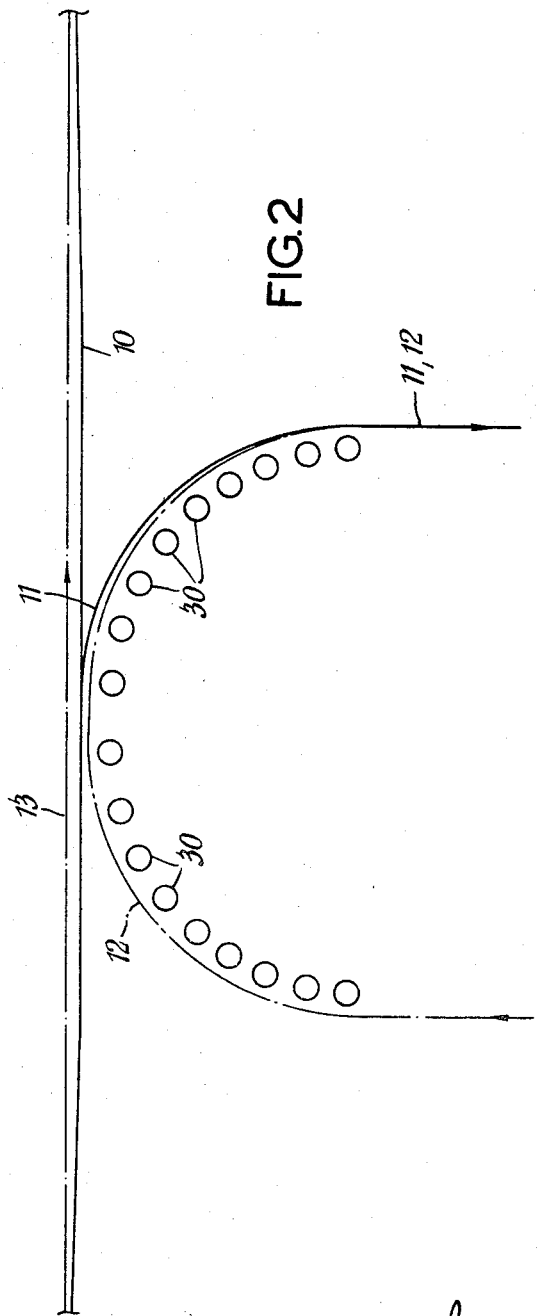
Inventor
Arthur Thomas Charles Burrows
By Cushman, Darby & Cushman
Attorneys Sept. 10, 1968   A. T. C. BURROWS   3,400,666
CONVEYOR SYSTEMS Filed Jan. 16, 1967   6 Sheets-Sheet 4

Sept. 10, 1968    A. T. C. BURROWS    3,400,666
CONVEYOR SYSTEMS

Filed Jan. 16, 1967    6 Sheets-Sheet 5

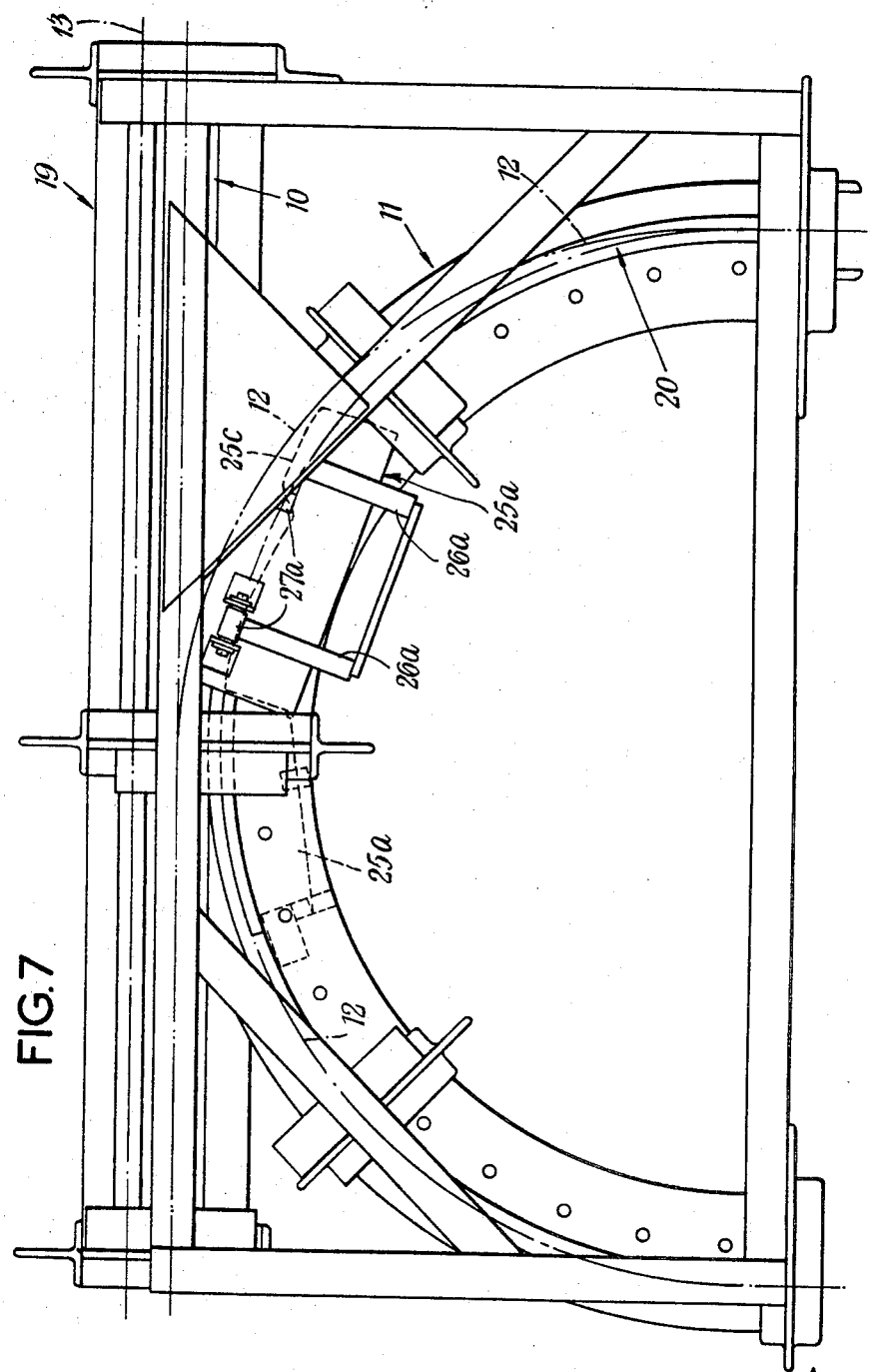

United States Patent Office 3,400,666
Patented Sept. 10, 1968

3,400,666
CONVEYOR SYSTEMS
Arthur Thomas Charles Burrows, Stevenage, Hertfordshire, England, assignor to Geo. W. King Limited, Stevenege, Hertfordshire, England, a British company
Filed Jan. 16, 1967, Ser. No. 609,401
Claims priority, application Great Britain, Jan. 21, 1966, 2,948/66
6 Claims. (Cl. 104—96)

ABSTRACT OF THE DISCLOSURE

A conveyor installation of the dual duty type wherein provision is made for switching load carrying trolleys from a main line to a branch line and vice-versa. The drive chains of both the main and branch lines are arranged to run in side by side relation for a short distance in the switch zone and the depending pusher dogs on the branch line chain are equipped with latch devices whereby they may be rendered operative or inoperative at will. Provision is made whereby during non-switching periods such latch devices will be tripped to render the pusher dogs on the branch line drive chain ineffective during their passage through the switch zone while during switching operations tripping of said latch means will not take place and the pusher dogs on the branch line chain will be effective to push the trolleys.

---

This invention relates to conveyors of the so-called dual duty type wherein load carrying trolleys are propelled along a fixed track or runway by virtue of the engagement therewith of pusher dogs or driving abutments which depend from an endless drive chain travelling along a path above the track or runway on which the load carrying trolleys are supported.

It is the chief object of the present invention to provide means whereby load trolleys propelled along the track or runway of a main conveyor line may be diverted or transferred at will to the track or runway of a branch or auxiliary conveyor line or vice versa.

Broadly in accordance with the invention it is proposed in a system including a main conveyor and a branch or auxiliary conveyor of the type set forth to provide in the track or runway of the main conveyor a track switch device whereby load trolleys may be diverted at will on to the track or runway of the branch or auxiliary conveyor or vice versa and to arrange in the region of the track junction for the drive chains of the respective conveyors to run for a short distance in side by side relationship, the drive chain of the branch line conveyor being equipped with pusher dogs or driving abutments having cooperating latch or pawl devices whereby said dogs or abutments may be rendered operative or inoperative at will, the arrangement being such that during a non-transfer period the latch or pawl devices will be tripped to render the pusher dogs or driving abutments on the drive chain of the branch or auxiliary conveyor inoperative while when transfer is to be effected tripping of said latch or pawl means will not take place. The tripping of the latch or pawl devices may be effected by a ramp or like device which is capable of movement into and from an operative position wherein it will cooperate with said latch or pawl devices to effect tripping thereof. Alternatively the ramp or like device may include a fixed portion effective to trip every pawl or latch device and a movable portion adapted to be moved when required into an inoperative or non-tripping position. The arrangement may be such that the ramp or like device or the movable portion thereof where such is present will normally assume its operative position and when necessary means either manually, electrically, pneumatically or hydraulically operated will be provided for moving said device into an inoperative or retracted position.

Figure 3:
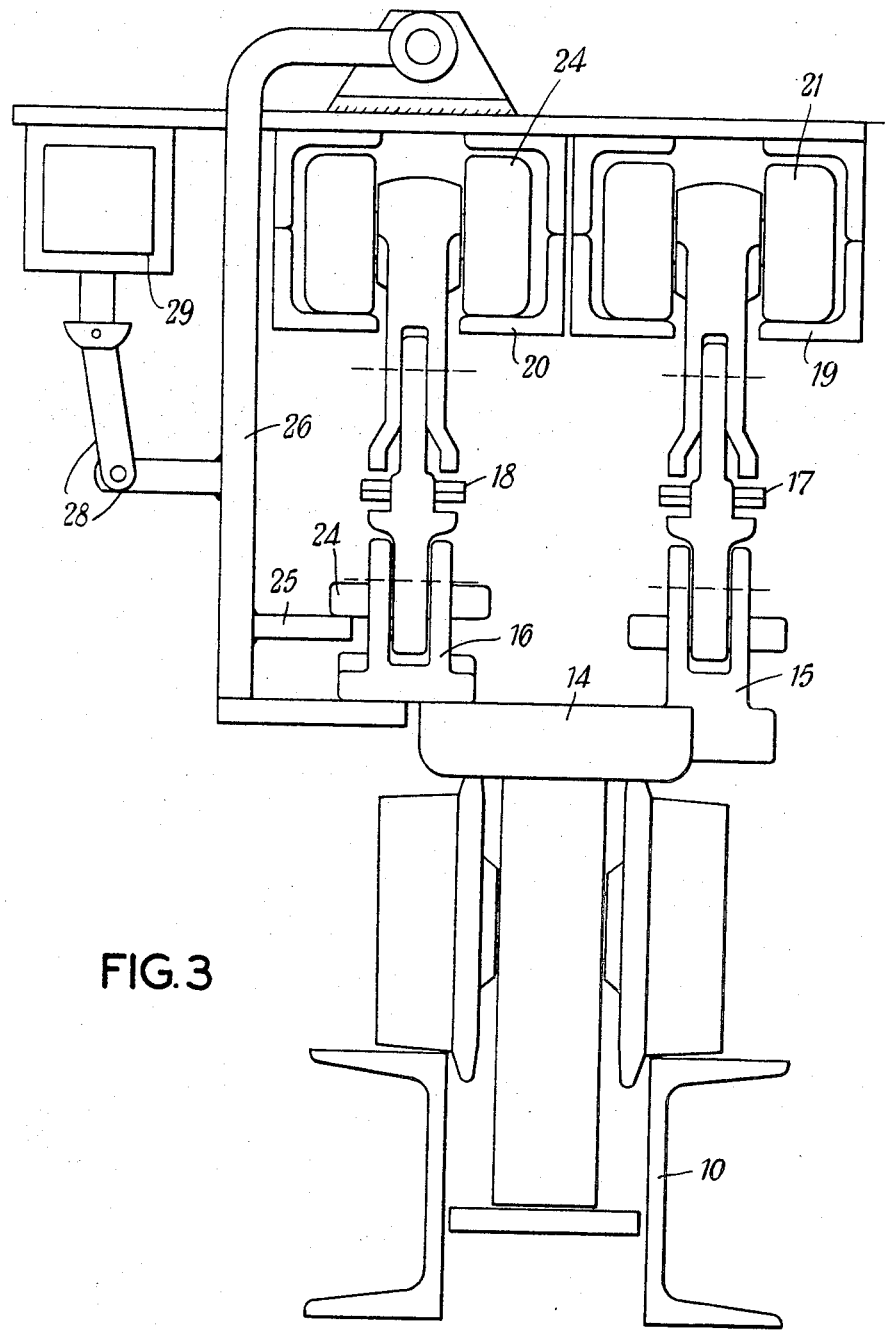
Figure 4:
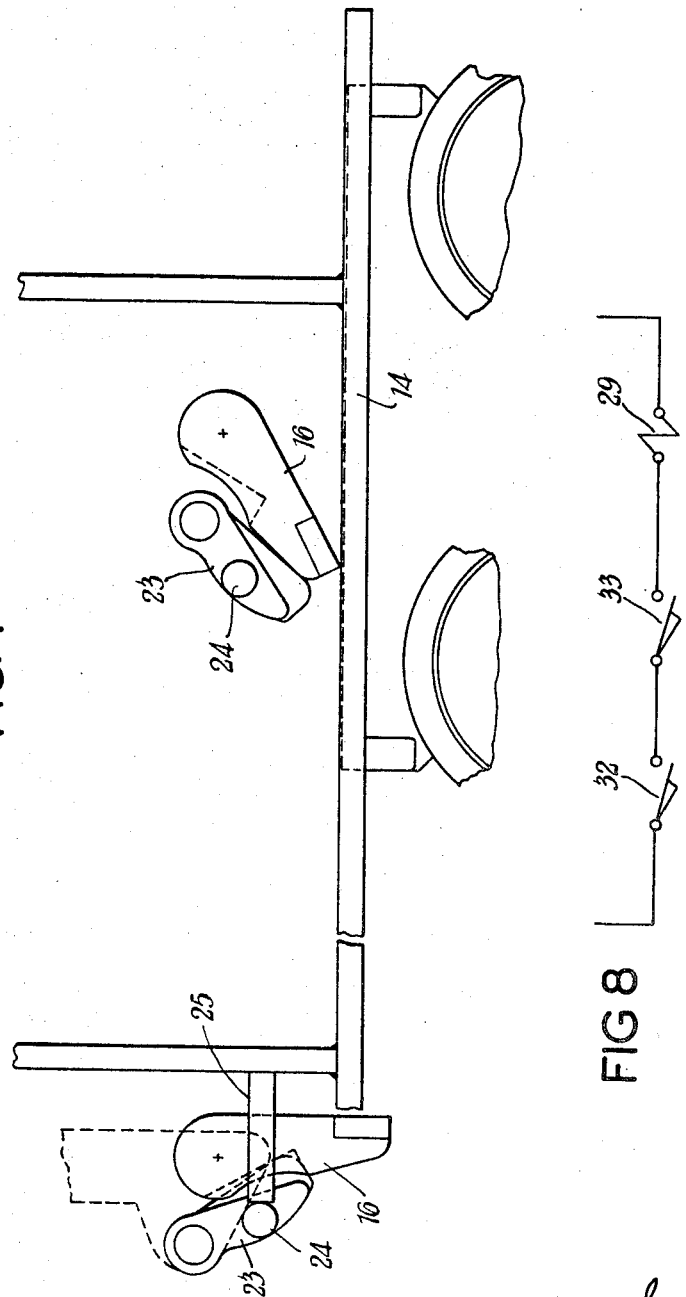
Figure 5:
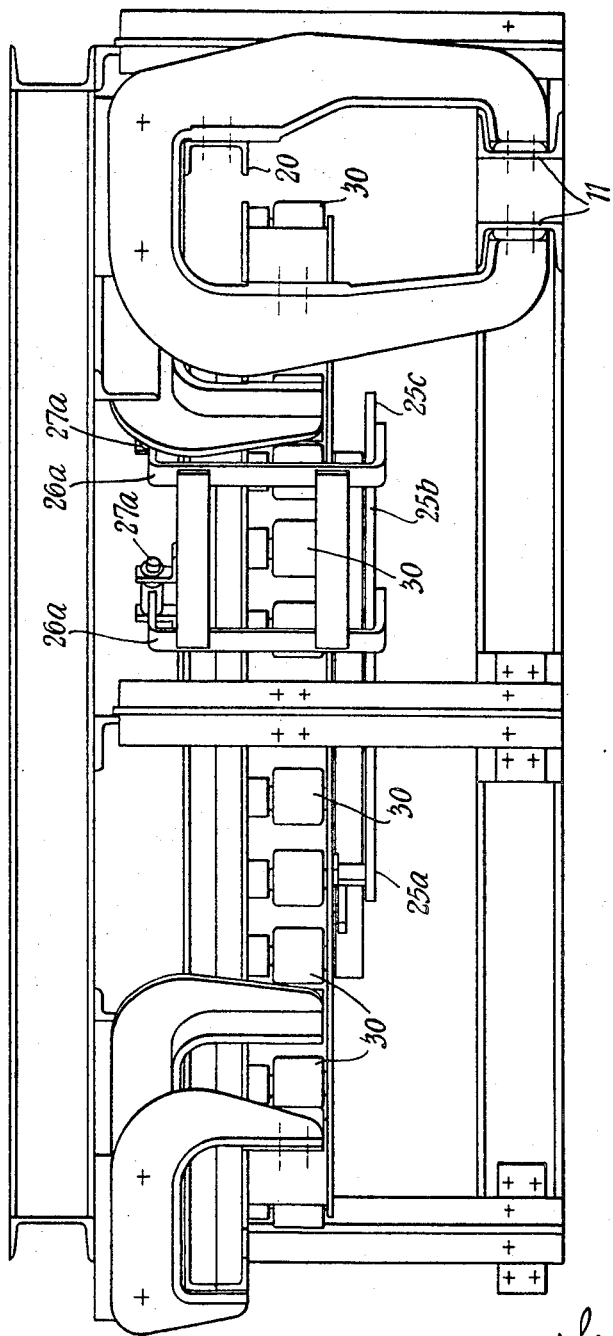
Figure 6:
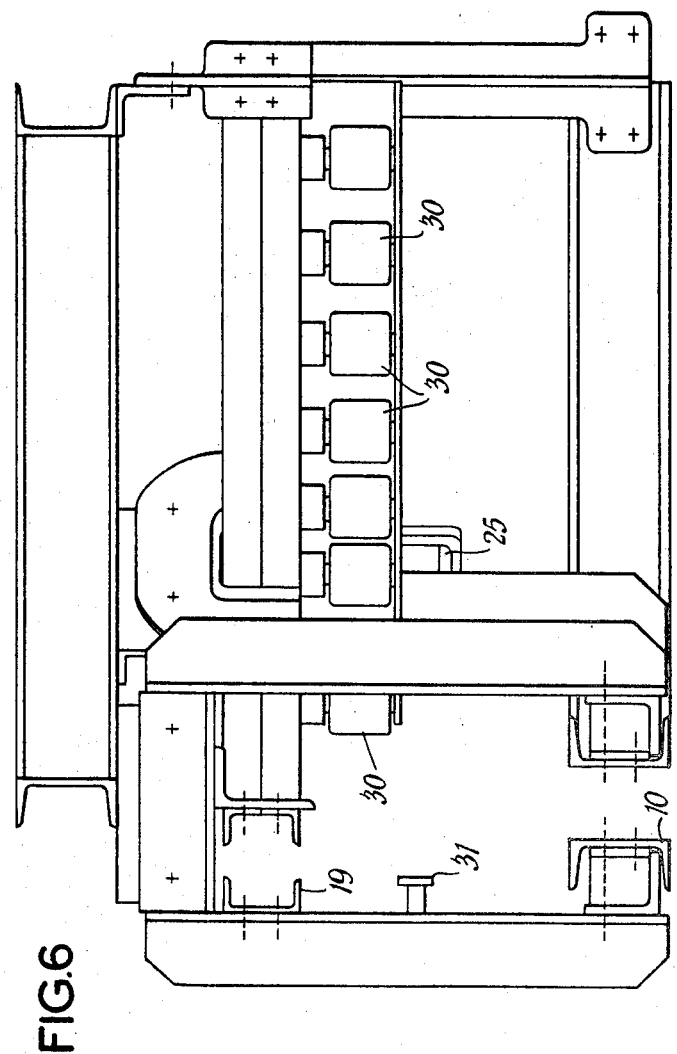

In order that the invention may be clearly understood and readily carried into effect reference will now be made to the accompanying drawings in which:

FIGURE 1 is a diagrammatic view illustrating the type of conveyor with which the invention is concerned, FIGURE 2 is a diagrammatic plan view of transfer point whereat load carying trolleys may be transferred from a main conveyor line to a branch track, FIGURE 3 is a diagrammatic view illustrating the disposition of the drive chains of the main and branch conveyor lines at the transfer point and also the ramp device through the medium of which the effectiveness or otherwise of the drive dogs on the branch line chain is controlled, FIGURE 4 is a diagrammatic side elevational view illustrating the manner in which the drive dogs of the branch line chain are controlled, FIGURES 5, 6 and 7 are respectively in side elevational, end elevational and plan view of one constructional form of a switch and transfer unit incorporating a modified ramp arrangement, FIGURE 8 shows an appropriate electrical circuit for incorporation in the embodiment shown in FIGURES 2–3.

As hereinbefore indicated the invention is concerned with conveyors of known kind which is illustrated diagrammatically in FIGURE 1. Referring now to that figure, 1 denotes a fixed track hereinafter referred to as the trolley track along which load carrying trolleys 2 are propelled by virtue of engagement therewith of pusher dogs 3 which are spaced along and depend from an endless driven chain 4. The chain is supported by hanger brackets or attachments from so-called chain trolleys 5 which run on an upper or chain trolley track 6 so that said chain will travel along a path vertically above the main track 1. Also associated with the driven chain 4 are depending retainer dogs 7 which alternate with the aforesaid pusher dogs 3 and serve to prevent uncontrolled forward movement of the load trolleys relatively to the chain when for example the conveyor path is inclined downwardly. The load trolleys 2 are equipped with depending load bars 8 to which loads to be conveyed will be attached.

In the present case the problem is to provide means whereby load carrying trolleys travelling along the trolley track of a main conveyor line may be transferred as and when required to the trolley track of a branch or subsidiary conveyor line or alternatively to provide for transfer in the reverse direction i.e. from a branch line to a main line.

Referring now to FIGURES 2–4 which illustrate an arrangement for transferring load trolleys from a main to a branch line, 10 denotes the main line trolleys track while 11 denotes the branch line trolley track. At the confluence of the two tracks 10, 11 a track switch of known type is provided, the arrangement being such that on actuation of said switch any trolley moving along the main line 10 will on reaching the switch be diverted on to the trolley track 11 of the branch line. It will be appreciated that on diversion of a trolley from the main line trolley track 10 it will pass out of contact with the pusher dog or abutment on the drive chain of the main line and that provision must therefore be made for imparting a drive thereto as it enters the branch line. Accordingly as will be clearly seen from FIGURE 2 the endless drive chain of the branch line conveyor is arranged to travel in proximity with the drive chain of the main line conveyor in the region of the confluence of the trolley tracks 10, 11. In the drawings the paths of travel of the branch and main line drive chains are indicated by chain dotted lines designated 12 and 13 respectively. As will also be seen from FIGURE 2 the drive chain of the branch line conveyor is conveniently caused in the region of the junction of the two trolley tracks 10, 11 to follow a path approximating somewhat to a semi-circular form in plan, such chain approaching the drive chain of the main line along a curved path, moving substantially parallel with said main drive chain for a short distance and then travelling away from said main drive chain in a curved path above the trolley track of the branch line conveyor. Whereas in normal circumstances the drive chains will be disposed vertically above the centre lines of their respective trolley tracks their paths of travel in the region of the trolley track junction are slightly displaced as will be apparent from FIGURE 2. This arrangement is also illustrated in FIGURE 3 wherein 14 denotes a load trolley on the main trolley track 10 while 15 and 16 respectively denote pusher dogs on the drive chains 17 and 18 of the main and branch lines respectively. In FIGURE 3 the upper or so-called chain trolley tracks 19 and 20 are indicated, such tracks serving to support the so-called chain trolleys designated 21 and 22 in FIGURE 3 from which the respective drive chains are suspended.

The pusher dogs 16 on the drive chain of the branch line will be of a particular known type such as is indicated in FIGURE 4 i.e. each pusher dog will be pivotally mounted at the lower end of a clevis or like attachment associated with the drive chain and a pivoted retaining pawl 23 will also be provided on said clevis or attachment to cooperate with the dog, such pawl being capable of pivoted movement from or into an operative position shown at the left of FIGURE 4 wherein it will positively lock the dog 16 against pivotal or angular movement so that it (the dog) will be effective to impart a drive to the load trolley, the arrangement being such that when said pawl is tripped or rendered inoperative as shown at the right of FIGURE 4 the dog 16 will be free to pivot idly and will be ineffective to impart a drive to any load trolley. In the present case each pivoted retaining pawl 23 is provided as indicated in FIGURE 3 with a laterally directed projection 24 and in the region of the transfer zone as clearly indicated in FIGURE 3 a movable ramp device 25 is provided which is adapted to cooperate with the projection 24 on said pawls 23, the arrangement being such that when the ramp is in its operative position as illustrated in the drawings it will cooperate with the projections on the pawls and will cause the latter to be tripped thereby to free their associated pusher dogs while when said ramp 25 is retracted it will be out of the path of the projections on the pawls and the latter will then be effective to maintain the pusher dogs 16 rigid so that they will constitute effective drive means. The ramp 25 which is supported by brackets 26 pivoted at 27 for movement about an axis over the centre line of the branch line chain may be so arranged as to be movable manually into and out of its operative position or alternatively it may be actuated electrically, pneumatically or hydraulically. In FIGURE 3 the ramp 25 is shown as being connected through the medium of a linkage 28 with a solenoid 29 the arrangement being such that on energisation of the solenoid it (the ramp) will be moved into its inoperative or retracted position wherein it may be held by an appropriate latch device. With the particular construction shown the ramp 25 will tend to return to its operative position under the action of gravity upon deenergisation of the solenoid but if necessary suitable spring or counterweight means may be provided to assist in this return movement.

It may be mentioned that in FIGURE 3 the pusher dog 15 on the drive chain of the main conveyor is shown as being equipped with a pawl having laterally directed projections similarly to the pusher dog 16 on the chain of the branch line conveyor. This is not of course necessary and the pusher dogs on the drive chain of the main line conveyor may be of the standard non-latching type hitherto commonly employed in conveyors of this type.

In FIGURE 2 the reference 30 denotes freely rotatable rollers which serve as anti-friction guide means for the chain of the branch line conveyor as it travels around its curved path.

In FIGURE 8 an appropriate ramp actuating circuit is illustrated wherein 32 denotes a limit switch adapted to be actuated by a trolley being transferred, while 33 is a limit switch adapted to be actuated by a dog on the drive chain of the branch conveyor.

The arrangement above described is adapted to operate as follows:

Normally load trolleys will be propelled along the main conveyor line 10 in the normal manner and the ramp device 25 will be maintained in its operative position so that as the pusher dogs 16 on the drive chain of the branch line approach and move through the transfer or switch zone the pawls 23 cooperating with said pusher dogs will be tripped so that the dogs on the drive chain of the branch line will be rendered ineffective. When however a load trolley approaching the track switch in the trolley track 10 of the main line is to be transferred to the branch line the track switch will be actuated to cause the necessary diversion of the trolley which will be pushed on to the initial portion of the branch line by the dog on the drive chain of the main conveyor. As a position is approached where the dog on the chain of the main conveyor will move out of contact with the trolley the latter will operate the limit switch 32. The second limit switch 33 which is wired in series with the switch 32 will be operated by the next available pusher dog on the drive chain of the branch line conveyor thereby to cause energisation of the solenoid 29 and retraction of the ramp 25, so that as the next pusher dog on the drive chain of the branch line enters the transfer zone the retaining pawl 23 associated therewith will remain in the operative position so that said dog will be maintained rigid and effective as a drive member. Thus as it enters the transfer zone, the trolley to be transferred will be propelled initially by a pusher dog on the drive chain of the main line conveyor on to the initial portion of the branch line and subsequently by a latched pusher dog or abutment on the drive chain of the branch line conveyor which latched dog will continue to drive the trolley along said branch line. A control arrangement such as that indicated is necessary to ensure that a trolley will not be fed into the side of a branch line pusher dog on transfer from the main conveyor line. It may be mentioned here that despite the showing in FIGURE 3, the dogs on the main and branch lines will not normally be in line during a transfer operation.

An alternative construction is shown in FIGURES 5, 6 and 7 wherein corresponding parts are indicated by the same reference numerals as those employed hitherto. In this case the arrangement of the conveyor chains and the construction of the dogs on the drive chain of the branch conveyor is the same as before but the ramp is made in two parts, a fixed part 25a and a movable part 25b which latter similarly to the ramp 25 above described is supported by brackets 26a pivoted at 27a for movement about an axis over the centre line of the branch line chain. The movable part 25b of the ramp is provided with a protruding portion 25c which is adapted to project into the path of a trolley being transferred on to the branch line. The arrangement is such that the movable part 25b of the ramp will normally tend to assume its operative position wherein it is in alignment with the fixed part 25a, under the action of its own weight but if desired springs may be incorporated to assist in return movements after each actuation.

With the construction illustrated in FIGURES 5-7 the fixed part 25a of the ramp will be effective to trip the pawl 23 of each pusher dog 16 on the branch line chain as it enters the transfer zone. In the event that the track switch is operated to effect transfer of a trolley the dog 15 on the main line chain will be effective to push the trolley on to the initial part of the branch line with the result that the leading end of the trolley will push against the protruding portion 25c of the movable part 25b of the ramp thereby causing the latter to be moved to a retracted position wherein it will be ineffective to trip the pawl 23 of an approaching dog on the branch line chain. The latched dog in question will thus be effective to propel the trolley along the branch line and after such trolley has cleared the movable part 25a of the ramp the latter will return to its initial position either under its own weight or with the assistance of appropriate springs. With an arrangement such as is illustrated in FIGURES 5–7 the necessity to operate the ramp by ancillary means e.g. the solenoid 29 is dispensed with.

In FIGURE 6, 31 denotes a guide for the drive chain of the main conveyor, the drive chain of the branch conveyor being guided as before by the freely rotatable rollers 30.

If it is required to feed load trolleys from a branch to a main line then at an appropriate zone on the branch line preceding the track junction with the main line an indexing mechanism of known type will be installed for the purpose of holding trolleys in readiness for transfer. When trolleys are held by the indexing mechanism appropriate ramp means will be provided to trip the retaining pawls cooperating with the pusher dogs on the drive chain of the branch line. As a free pusher dog on the drive chain of the main line conveyor approaches the transfer point the indexer mechanism will be actuated to release the leading trolley previously held thereby and simultaneously the ramp device will be treated so that a pusher dog on the drive chain of the branch line will be effective to push said pulley forward and on to the main line trolley track when it will be contacted and driven by the erstwhile free pusher dog on the drive chain of the main line conveyor. The arrangement will be such that normally i.e. when no transfer is to be effected, the ramp mechanism will be effective to trip the retaining pawls during passage of the drive chain of the branch line conveyor through the transfer zone so that as the pusher dogs on the drive chain of the branch line pass through the transfer zone they will not foul or hinder movement of the load trolleys passing by and driven by the drive chain of the main line conveyor.

I claim:

1. In a conveyor installation including a main conveyor and a branch conveyor each of the type wherein load trolleys are propelled along a trolley track by means of pusher dogs carried by an endless drive chain, the trolley tracks of the two conveyors being inter-connected by a track switch whereby transfer of trolleys from one track to the other may be effected, the improvement which consists in arranging the drive chains of the two conveyors to run in side by side relationship above the trolley track of the main conveyor in the region of the track switch and providing means for effecting transfer of trolleys from one conveyor to the other on operation of said track switch such means comprising pivoted pusher dogs on the drive chain of the branch conveyor, retaining pawl means cooperating with each such dog and movable into and out of an operative position wherein it will lock said dog and render it effective to propel a trolley and means whereby during a non-transfer period the pawl means will be tripped during passage of the dogs over the track switch but during a transfer operation passage of a dog will be allowed without tripping of its cooperating pawl means so that such dog will be effective to push any load trolley being transferred.

2. A conveyor installation as in claim 1 wherein the tripping means comprises a movable ramp member which tends normally to assume an operative position wherein it will be effective to trip the pawl means, there being means for moving said ramp member to an inoperative position when a transfer operation is to be effected.

3. A conveyor installation as in claim 1 wherein the tripping means comprises a movable ramp member which tends normally to assume an operative position wherein it will be effective to trip the pawl means, there being means for moving said ramp member to an inoperative position when a transfer operation is to be effected, such means comprising electro-magnetic means and linkage means coupling said ramp member to said electro-magnetic means so that on energisation of the latter appropriate movement of the ramp member will result.

4. A conveyor installation as in claim 1 wherein the tripping means comprise a fixed ramp member adapted to trip the pawl means of each dog as it approaches the track switch and a movable ramp member displaceable on actual switching of a trolley into a non-tripping position.

5. A conveyor or installation as in claim 4 in which the movable ramp member includes a portion arranged to protrude into the path of any trolley being switched so that the trolley will be effective to cause displacement of said movable ramp member into a non-tripping position.

6. A conveyor installation as in claim 1 wherein in the region of the track switch the drive chain of the branch conveyor is caused to follow a path approximating to a semi-circular form in plan, said chain approaching the drive chain of the main conveyor along a curved path, moving substantially parallel with said main conveyor or drive chain over the track switch and then travelling away from the latter in a curved path above the trolley track of the branch conveyor.

References Cited

UNITED STATES PATENTS 3,099,966  8/1963  Bishop _____ 104—96
3,257,963  6/1966  King _____ 104—96

D. F. WORTH, *Assistant Examiner.*

ARTHUR L. LA POINT, *Primary Examiner.*